Nov. 28, 1944.    O. J. BRATZ ET AL    2,363,938
MACHINE FOR PROOF TESTING THE HOLDING EFFICIENCY
BETWEEN WIRE CABLES AND FITTINGS, ETC
Filed July 23, 1942    3 Sheets-Sheet 1
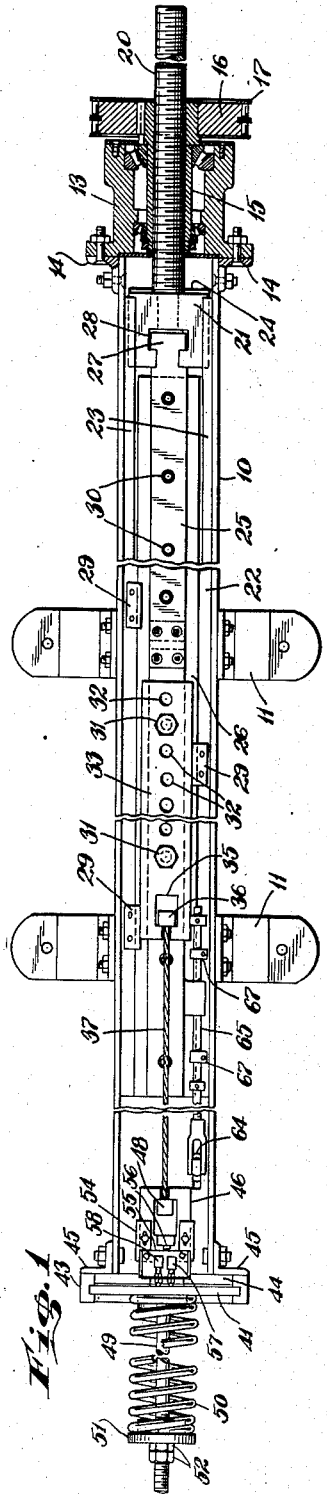
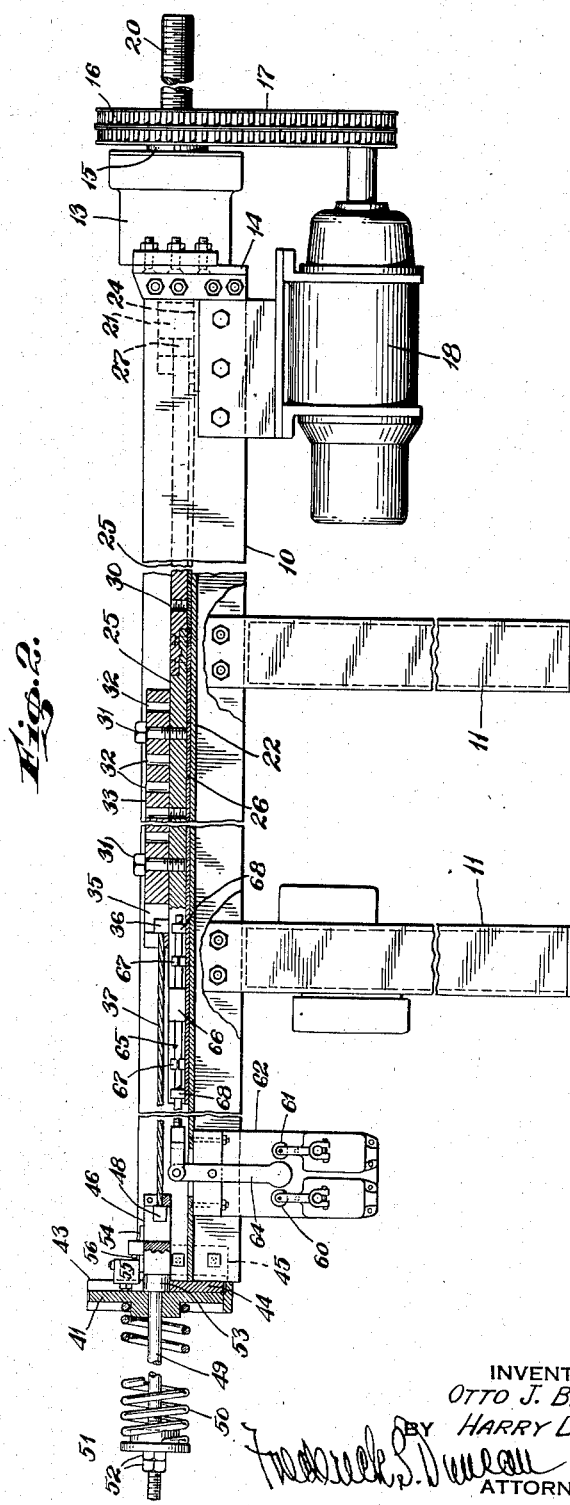
INVENTORS
OTTO J. BRATZ
HARRY D. BALUSS
BY
ATTORNEY

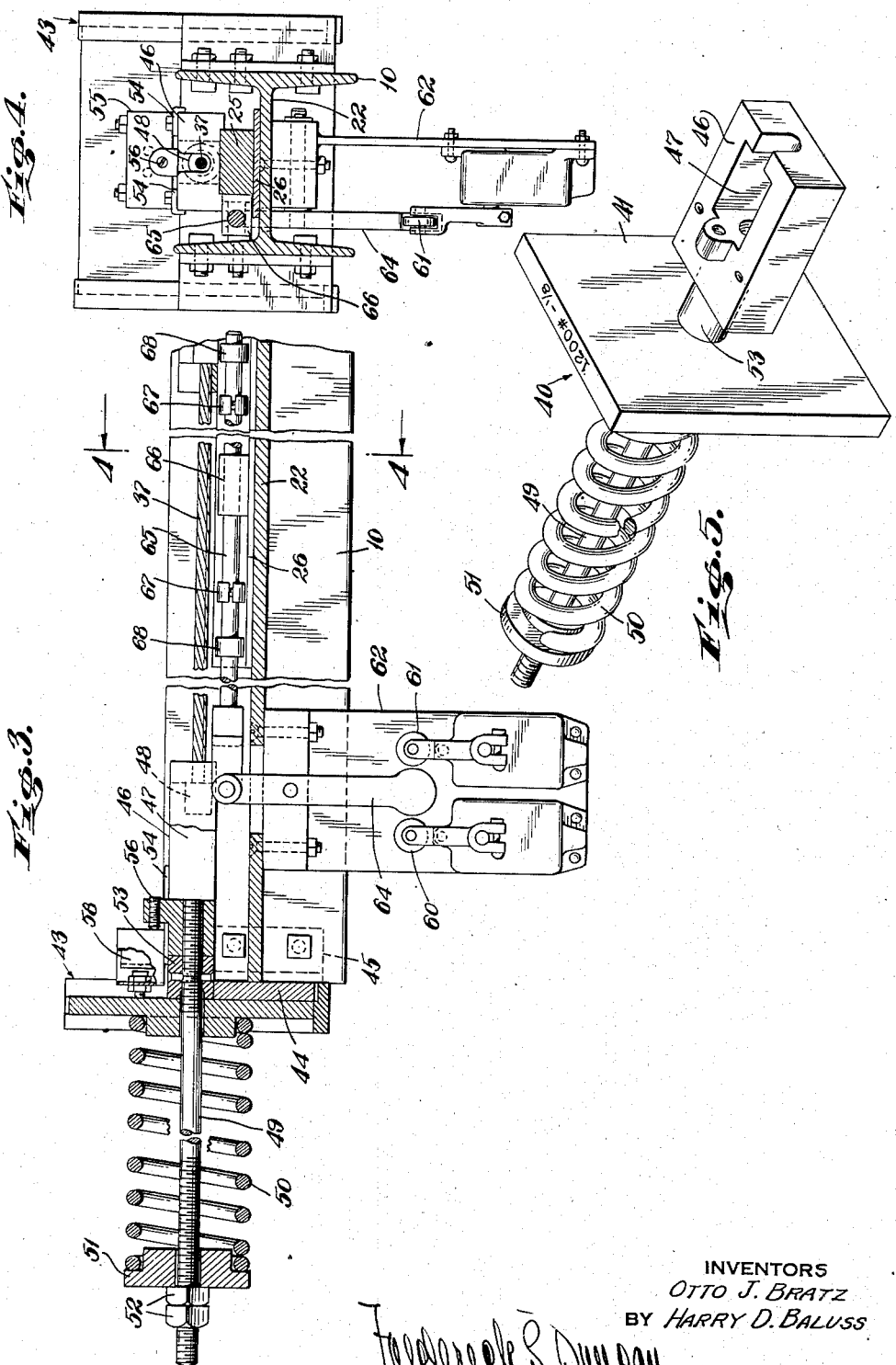

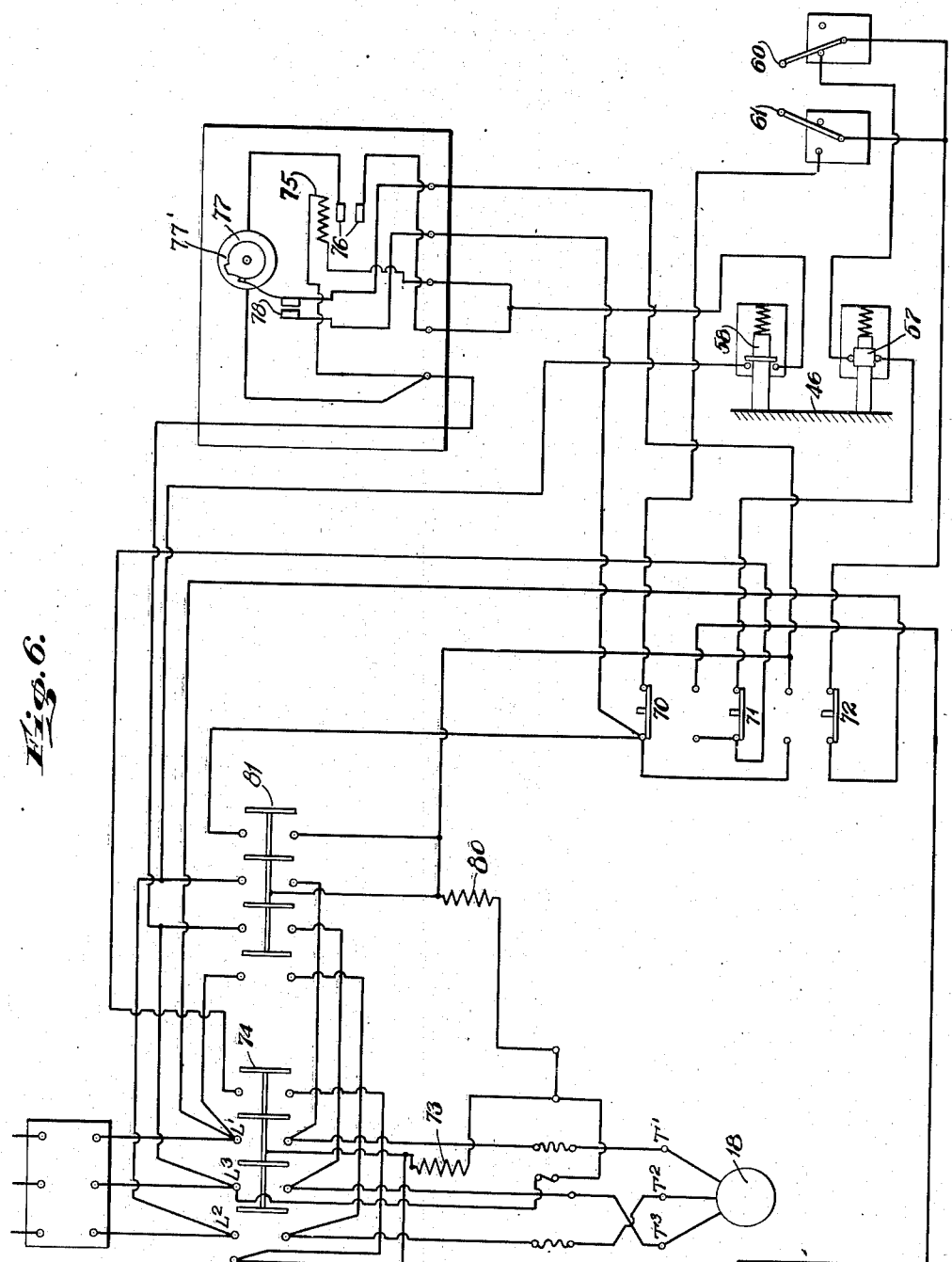

Patented Nov. 28, 1944

2,363,938

UNITED STATES PATENT OFFICE 2,363,938

MACHINE FOR PROOF TESTING THE HOLDING EFFICIENCY BETWEEN WIRE CABLES AND FITTINGS, ETC.

Otto J. Bratz, Adrian, and Harry D. Baluss, Palmyra, Mich., assignors to American Chain & Cable Company, Inc., Bridgeport, Conn., a corporation of New York Application July 23, 1942, Serial No. 452,119

13 Claims. (Cl. 73—160)

This invention relates to a proof testing machine for testing cables and the holding power between end fittings and cables.

Among the objects of this invention is the production of a machine for testing the strength of cables and for testing for sufficiency of holding power between end fittings and cables by placing a predetermined load on the cable for a predetermined length of time.

Another object of this invention is the provision of means facilitating adaptation of the machine for testing cable assemblies of different lengths and different diameters and equipped with different end fittings, for different predetermined loads.

Other objects of this invention will appear from the following description taken in connection with the drawings in which Fig. 1 is a top plan view of a testing machine built in accordance with our invention showing parts in horizontal section;

Fig. 2 is a side elevational view of the machine, showing parts in vertical section;

Fig. 3 is an enlarged view of the left-hand end of Fig. 2;

Fig. 4 is a vertical cross section on the line 4—4 of Fig. 3;

Fig. 5 is a perspective view of one of the detachable spring loaded units; and

Fig. 6 is a wiring diagram of a preferred wiring system employed in controlling the machine.

For the purposes of disclosure we have illustrated what now appears to be a preferred embodiment of our invention in which the motive force for placing the cable under tension is provided by a motor which is key and automatically controlled.

The frame of the machine comprises a long H shaped beam 10 of a length slightly longer than the longest cable to be tested. This beam is preferably supported off the floor at a convenient working height by legs 11 preferably suitably bolted thereto and to the floor as indicated. In long frames the H beam 10 is made in sections as is understood.

Mounted at one end of the H beam 10, Figs. 1 and 2, is a cylindrical thrust receiving housing 13 secured on the H beam by angle pieces 14 as indicated. Rotatably mounted within the thrust receiving housing is an interiorly threaded cylindrical member 15 held and rotatably supported within the housing by thrust bearings as indicated. Mounted on one end of the member 15 is a sprocket wheel 16 which is driven at a suitable reduced speed by a sprocket chain 17 from a motor 18.

Threadedly engaging the interiorly threaded member 15 is a threaded pull rod 20 which is provided with a slide bar coupling block or head 21 slidable on the web 22 of the H beam. This block may be held on the web by means of guiding flanges 23 on the upper portions of the legs of the H beam and may be provided with a wearing plate 24 sliding on the web 22.

Mounted on the web 22 of the H beam 10 is a sectional composite slide bar 25 provided with wearing plates 26 as indicated. This bar is provided at one end with a T head 27 for engagement with a corresponding opening 28 in the coupling block 21. Guides 29 secured to the web 22 are provided to guide the movement of the slide bar 25.

The slide bar 25 is provided with a series of spaced threaded holes 30 for engagement by bolts 31 which may be passed through different closely spaced holes 32 in a motor pulling block 33 provided with an opening or seat 35 at one end for receiving a fitting 36 on one end of a cable 37 or for receiving adapters (not disclosed) to receive fittings of various shapes and forms and sizes. By means of this construction the motor pulling block 33 may be adjusted on the composite bar 25 for testing different lengths of cables.

Detachably mounted on the other end of the H beam 10 is a spring loaded pulling block assembly 40 Fig. 5 which includes a base plate 41 slidably and detachably received in grooves in the side walls of a generally U-shaped pocket 43 Figs. 1 and 3 which includes a cross web abutment plate 44 and which is secured as by angle irons 45 to the end of the H beam 10.

The pulling block assembly 40 includes a pulling block 46 provided with an opening 47 for receiving the other end fitting 48 on the cable or fitting adapters (not disclosed). This pulling block is threadedly secured on a rod 49 slidably mounted in the base plate 41 and surrounded by a helical spring 50 seated at one end against the base plate 41 and at its other end against a disc 51 surrounding the rod 49 and held in position on the rod by means of nuts 52 by means of which the amount of compression of the spring may be regulated. A threaded collar 53 is locked to the rod 49 and constitutes a fixed adjusted limiting abutment for the base plate 41.

Adjustably mounted on the pulling block 46 are plates 54 Fig. 1 which may as disclosed be locked in adjusted position by set screws. These plates carry a switch housing 55 in which are housed two switches which may be of the clicker type. The position of the housing may be adjusted by a screw 56. One of these switches 57 is closed, Fig. 6, when the parts of the machine are in home position and its function as will be described will be to open the circuit of the motor 18 after a predetermined amount of forward travel of the spring loaded pulling block 46. The other of these switches 58 is open when the spring loaded pulling block 46 is in its home position and is adapted to be closed after a predetermined amount of forward travel of the pulling block 46 and slightly before the switch 57 opens, to set a timing mechanism in operation which reverses the motor 18. These switches include plungers which after a predetermined outward movement respectively open and close the circuits and which bear against the base plate 41 of the spring loaded pulling block assembly 40.

The controlling mechanism also includes a forward limit switch 60 and a reverse limit switch 61 which are mounted on a plate 62 suitably suspended from the web 22 of the H beam 10. These switches are operated by a lever 64 which is actuated by a rod 65 slidably passing through a lug 66 on the slide bar 25. Adjustably secured on the rod on opposite sides of the lug 66 are collars 67 by means of which the rod 65 is operated at the ends of the forward and rearward movements of the slide bar 25. The rod is also equipped with fixed collars 68.

The wiring diagram

A suitable wiring diagram for the machine is disclosed in Fig. 6. The motor there disclosed is a three phase motor and the lines from the current supply are indicated by L2, L3 and L1 and the lines to the motor by T3, T2 and T1. An operating keyboard is provided with three keys, a forward key 70, a reverse key 71, and a stop key 72. The reverse and stop keys are used only during testing operations.

The forward key 70 is operated to set the machine in operation. When the forward key is depressed it closes a circuit for the forward operating coil 73 of the magnetic reversing switch mechanism which operates its contact bar 74 to complete a motor circuit to operate the motor in a forward direction. The circuit for the operating coil may be traced from the line L3 across the coil 73, the forward depressed key 70, the reverse key 71, the clicker switch 57, the forward safety limit switch 60, and the stop key 72 to the line L1.

The forward operating coil 73 is held operated by a locking circuit from the line L3 across the coil 73, one of the contact plates of the contact bar 74, the reverse key 71 and thence across the switches 57 and 60 and the stop key 72 to the line L1 so that the forward key 70 may be immediately released.

The motor 18 now operates forwardly to pull the motor pulling block 33 toward the right and through the cable pulling the spring loaded pulling block 46 toward the right carrying the clicker switches 57 and 58 away from the base plate 41 of the spring loaded pulling block assembly 40. After the spring loaded pulling block 46 has been moved forward a predetermined distance which in the machine constructed is $\tfrac{7}{32}''$ the plunger of the switch 58 will have moved far enough to close the circuit across its contacts. This circuit extends from the line L2 across the contact of the switch 58, a coil 75 in the timing mechanism, to line L3. This energizes the coil and closes the auxiliary contacts 76 of a well known form of timing mechanism completing a circuit across a timing motor 77 to the line L3. This sets the timing motor in operation which after a predetermined interval of time by means of a cam indicated at 77' closes the main contacts 78 of the timing mechanism. Before the main contacts 78 are closed the spring loaded pulling block 46 will have been moved farther to the right and after an additional $\tfrac{1}{32}''$ movement the clicker switch 57 opens and releases the forward operating coil 73 of the magnetic reversing switch causing the motor to stop.

The closing of the main contacts 78 of the timing mechanism completes a circuit for the reverse operating coil 80 of the magnetic reversing switch. This circuit may be traced from the line L3 across the coil 80, the main contacts 78, the forward key 70, the reverse limit switch 61 which is now closed and the stop key 72 to the line L1. The reverse switch operating coil 80 operates and shifts its contact bar 81 closing a holding circuit for itself across the forward key 70. This closes the reverse operating circuit for the motor 18 causing the pulling blocks to be moved toward the left to release the end fittings from the pulling blocks and this movement continues until the lever 64 Fig. 3 opens the reverse limit switch 61 which releases the reverse operating coil 80. When the motor stops, the reversing switch 61 will be open, the clicker switch 57 closed, and the clicker switch 58 open which released the coil 75 of the timing mechanism and stopped the operation of the timing mechanism. All of the switches, etc. of Fig. 6 will now be in the positions indicated in Fig. 6.

Figs. 1, 2, 3 and 4 show the parts in the position they occupy as tension is applied to the cable. The wiring diagram in Fig. 6 shows the position of the switches when the machine is in its home position.

The motor may be stopped by pressing the stop key 72 which opens the holding circuits for the forward and reverse operating coils 73 and 80 of the magnetic reversing switch.

The motor may be operated in the reverse direction by pressing the reverse key 71 which closes the operating circuit for the reverse operating coil 80 from the line L3, across the coil 80, reverse key 71, forward key 70, reverse limit switch 61, stop key 72 to line L1.

The forward limit safety switch is provided to stop the motor in case the cable or fitting connection fails. The parts may then be returned to home position by pressing the reverse key 71.

The mechanism illustrated and described constitutes a preferred embodiment of our invention. It is obvious of course that various changes may be made. The machine may be constructed to test cables of the same length and diameter and having similar end fittings. It is preferred however to provide a machine which is long enough to test the longest of a series of cables of different diameters, to adjustably mount the motor pulling block 33 to accommodate different lengths of cables, to provide a series of readily assembled and replaceable pulling block assemblies 40 one for each diameter cable to be tested, and to provide means facilitating testing cables provided with different shapes of end fittings by constructing the openings in the pulling blocks so that adapters, not disclosed, may be readily used. It is preferred to use clicker switches and to use a timing mechanism of the general type disclosed but it is obvious that other types of switches and timing mechanisms, magnetic reversing switches and safety limit switches may be employed and that other driving connections between the motor and the screw member 15 may be used.

Operation

The machine is prepared for testing cables of different diameters and lengths and the holding efficiency between wire cables and fittings, by mounting the proper and identified pulling block assembly 40 in the pocket 43 and by positioning the motor pulling block 33 in the proper position on the slide bar 25 and also by employing when necessary adapters for receiving the end fittings 36 and 48 to connect them respectively to the motor pulling block 33 and the spring loaded pulling block 46.

The machine is then operated by pressing the forward key 70 which causes the motor to operate forwardly and move the motor pulling block 33 toward the right Figs. 1 and 2 tensioning the cable 37 and then through the cable pulling the spring loaded pulling block 46 to the right. This moves the clicker switches 57 and 58 away from the base plate 41 of the spring loaded pulling block assembly 40. After movement of approximately $\frac{1}{32}$" the clicker switch 58 will be closed and the timing mechanism will be set in operation. Upon a further movement of $\frac{1}{32}$" the clicker switch 57 will be opened. This will release the forward operating coil 73 stopping the motor 18. After a predetermined interval of time which may be five seconds or more the timing mechanism will close the main contacts 78 which close the operating circuit for the reverse operating coil 80 of the magnetic reversing switch causing the motor 18 to operate in a reverse direction which moves the motor pulling block 33 to the left Figs. 1 and 2 and permits the spring 50 to pull the spring loaded pulling block 46 to the left which operates to close the clicker switch 57 and then to open the clicker switch 58. As the slide bar 25 moves further to the left it operates the rod 65 which swings the lever 64 to open the reverse limit switch 61 which opens the circuit for the reverse operating coil 80 opening the reverse circuits for the motor and causing the motor to stop. The fittings are now free to permit the removal of the cable and fittings from the machine.

If the cable or cable fittings fail then the slide bar 25 will move far enough to the right to operate the forward limit switch 60 which opens the circuit of the forward operating coil 73 causing the motor to stop. The parts may be returned to their home position by pressing the reverse key 71.

During either a forward or reverse operation of the motor the motor may be stopped by pressing the stop key 72 which opens the holding circuits of the forward and reverse operating coils 73 and 80 of the magnetic reversing switch.

While we have illustrated and described a preferred form of our invention, it is to be understood that various changes will be apparent to one skilled in the art after understanding our invention and that we reserve the right to all such changes and modifications as fall within the principles of our invention and the scope of the appended claims.

We claim:

1. In a machine of the class described, the combination of a resiliently loaded pulling block adapted to detachably receive one end of an elongated member, a pulling block adapted to detachably receive the other end of said elongated member and mounted for movement toward and away from said first mentioned block, an operating means for moving said last mentioned block, means carried by said first mentioned block for arresting the operation of said operating means upon a predetermined movement of said first mentioned block, a timing mechanism, means also carried by said first mentioned block for setting said timing mechanism in operation after a predetermined amount of movement of said first mentioned block and before said operating means has been arrested, and means under control of said timing mechanism for causing said operating means to reverse its operation for returning said second mentioned block into its normal home position.

2. In a machine of the class described, the combination of a resiliently loaded pulling block adapted to detachably receive one end of an elongated member, a pulling block adapted to detachably receive the other end of said elongated member and mounted for movement toward and away from said first mentioned block, an operating means for moving said last mentioned block, means controlled by said first mentioned block for arresting the operation of said operating means upon a predetermined movement of said first mentioned block, a timing mechanism, means also controlled by said first mentioned block for setting said timing mechanism in operation after a predetermined amount of movement of said first mentioned block and before said operating means has been arrested, and means under control of said timing mechanism for causing said operating means to reverse its operation for returning said second mentioned block into its normal home position.

3. In a machine of the class described, the combination of two relatively movable members provided with means for connection with the ends of an elongated member, means for relatively moving said members away from each other to tension said elongated member and for moving said members as a unit, means for arresting the movement of said members upon a predetermined amount of movement of one of said members, a timing mechanism, means for setting said timing mechanism in operation after a predetermined amount of movement of said one member and before the arrest of the movement of said one member and means operable under control of said timing mechanism for reversing the operation of said moving means and returning said members to their home positions.

4. In a machine of the class described, the combination of a resiliently loaded pulling block adapted to detachably receive an end fitting on a cable, a motor pulling block adapted to detachably receive the other end fitting on the cable and mounted for sliding movement toward and away from said first mentioned block, an electric motor for operating said last mentioned block, switch means controlled by said first mentioned block for opening the circuit of said motor upon a predetermined amount of movement of said first mentioned block, a timing mechanism, means also controlled by said first mentioned block for setting said timing mechanism in operation after a predetermined amount of movement of said first mentioned block and before the circuit of said operating motor has been opened, and means operable under control of said timing mechanism for closing a reverse circuit across said operating motor for returning said pulling blocks into their normal home positions to release said end fittings from said blocks.

5. In a machine of the class described, the combination of a resiliently loaded pulling block adapted to detachably receive an end fitting on a cable, a motor pulling block adapted to detachably receive the other end fitting on the cable and mounted for sliding movement toward and away from said first mentioned block, an electric motor for operating said last mentioned block, switch means controlled by said first mentioned block for opening the circuit of said operating motor upon a predetermined amount of movement of said first mentioned block, a timing mechanism, means also controlled by said first mentioned block for setting said timing mechanism in operation after a predetermined amount of movement of said first mentioned block and before the circuit of the main operating motor has been opened, means operable under control of said timing mechanism for closing a reverse circuit across said operating motor for returning said pulling blocks into their normal home positions to release said end fittings from said blocks, means for automatically reversing the circuits across said operating motor upon failure of the connection between an end fitting and the cable and means for automatically opening the circuit of said operating motor for stopping said motor upon movement of said second mentioned block into its home position.

6. In a testing machine, the combination of a spring loaded pulling block, a motor operated pulling block, means on said blocks facilitating attachment thereto of the ends of an elongated member, manual means for setting the motor in forward operation to move said motor operated pulling block in a direction away from said spring loaded pulling block and through the elongated member move said spring loaded pulling block, means controlled by said spring loaded pulling block to stop the forward operation of said motor after a predetermined increase of load has been applied on said spring loaded pulling block and, after a predetermined interval of time, to reverse the operation of said motor to restore the pulling blocks to their home positions.

7. A spring loaded block comprising a plate, a plunger slidably extending through said plate provided at one end with a coupling block to detachably receive one end of an elongated member to be tested and provided at its other end with a spring abutment, a spring between said abutment and said plate resisting movement of said block away from said plate, and a pair of switches adjustably mounted on said block, including plungers normally abutting against said plate, one of said switches being normally closed and the other of said switches being normally open, said switches respectively opening and closing on movement of said block away from said plate.

8. In an apparatus of the character described comprising a frame, a pulling block, a reversible electric motor for operating said block, a loaded block, means for connecting an article to be tested to said blocks, a time delay mechanism for starting the reverse operation of said motor, and a pair of switches on said latter block including a normally open switch adapted upon a predetermined forward movement of said latter block to set said timing mechanism in operation and including a normally closed switch adapted upon a predetermined forward movement of said latter block to stop the forward operation of said motor.

9. In an apparatus of the character described comprising a frame, a pulling block, a reversible electric motor for operating said block, a loaded block, means for connecting an article to be tested to said blocks, a circuit controlled time delay mechanism for starting the reverse operation of said motor, a pair of switches on said latter block including a normally open switch in the circuit of said timing mechanism adapted upon forward movement of said latter block to close the circuit of said timing mechanism and including a normally closed switch adapted upon movement of said latter block to open the forward circuit of said motor, the closing and opening of said respective switches being timed so that said first mentioned switch will close a short interval of time before the second mentioned switch opens.

10. In an apparatus of the character described comprising a frame, a pulling block, a reversible electric motor for operating said block, a loaded block, means for connecting an article to be tested to said blocks, a circuit controlled time delay mechanism for starting the reverse operation of said motor, a pair of switches on said latter block including a normally open switch in the circuit of said timing mechanism adapted upon movement of said latter block to close the circuit of said timing mechanism and including a normally closed switch adapted upon movement of said latter block to open the forward circuit of said motor, the closing and opening of said respective switches being timed so that said first mentioned switch will close a short interval of time before the second mentioned switch opens, and a pair of switches for opening the motor circuits at the forward and reverse limits of movement of said first mentioned block.

11. In a testing machine, the combination of means for tensioning an article to be tested, manipulative means for setting said tensioning means in operation to tension said article, means set in operation by said article as a predetermined tension therein is attained for arresting the operation of said tensioning means, and delayed action means also set in operation by said article as its tension approaches the value of said predetermined tension for reversing the operation of said tensioning means after a predetermined lapse of time following the arrest of the operation of said tensioning means.

12. In a testing machine, the combination of means for tensioning an article to be tested, manipulative means for setting said tensioning means in operation to tension said article, means automatically set in operation to arrest the operation of said tensioning means as a predetermined tension in the article is attained, and means also automatically set in operation to reverse the operation of said tensioning means after a predetermined lapse of time following the arrest of said tensioning means.

13. In a testing machine, the combination of means for tensioning an article to be tested, comprising means for applying tension to one end of said article and yielding means to resist movement of the other end of said article as said article is tensioned, means operated by said yielding means as a predetermined tension in the article is attained for arresting said tension applying means, and time delay means also operated by said yielding means for reversing the operation of said tension applying means after a lapse of a predetermined period of time following the arrest of said tension applying means.

OTTO J. BRATZ.
HARRY D. BALUSS.